United States Patent
Kim et al.

(10) Patent No.: US 12,393,465 B2
(45) Date of Patent: Aug. 19, 2025

(54) HARDWARE-ACCELERATED COROUTINES FOR LINKED DATA STRUCTURES

(71) Applicant: Oracle International Corporation, Redwood Shores, CA (US)

(72) Inventors: Kangnyeon Kim, Dublin, CA (US); Aida Vosoughi, Pittsburgh, PA (US); Garret F. Swart, Palo Alto, CA (US)

(73) Assignee: Oracle International Corporation, Red Shores, CA (US)

( * ) Notice: Subject to any disclaimer, the term of this patent is extended or adjusted under 35 U.S.C. 154(b) by 479 days.

(21) Appl. No.: 17/976,969

(22) Filed: Oct. 31, 2022

(65) Prior Publication Data

US 2024/0143406 A1    May 2, 2024

(51) Int. Cl.
  G06F 9/46    (2006.01)
  G06F 9/48    (2006.01)
  G06F 9/50    (2006.01)

(52) U.S. Cl.
  CPC ............ G06F 9/5044 (2013.01); G06F 9/485 (2013.01); G06F 9/5016 (2013.01); G06F 9/505 (2013.01)

(58) Field of Classification Search
  CPC ...... G06F 9/5044; G06F 9/485; G06F 9/5016; G06F 9/505
  See application file for complete search history.

(56) References Cited

U.S. PATENT DOCUMENTS

| | | |
|---|---|---|
| 9,432,298 B1 | 8/2016 | Smith |
| 2017/0185527 A1 | 6/2017 | Ueda |
| 2018/0101530 A1 | 4/2018 | Brown |

OTHER PUBLICATIONS

Wang et al., "Investigating Memory Optimization of Hash-index for Next Generation Sequencing on Multi-core Architecture", IEEE 26th International Parallel and Distributed Processing Symposium Workshops & PhD Forum, dated May 2012, 10 pages.

Sidler et al., "StROM: Smart Remote Memory", in Proceedings of the Fifteenth European Conference on Computer Systems, DOI: 10.1145/3342195.3387519, dated Apr. 2020, 16 pages.

Kocberber et al., "Meet the Walkers: Accelerating Index Traversals for in-memory Databases", in Proceedings of the 46th Annual IEEE/ACM International Symposium on Microarchitecture, DOI: 10.1145/2540708.2540748, dated Dec. 2013, 12 pages.

(Continued)

*Primary Examiner* — Gregory A Kessler
(74) *Attorney, Agent, or Firm* — Hickman Becker Bingham Ledesma LLP; Brian Miller (57) ABSTRACT

A computer assigns many threads to a hardware pipeline that contains a sequence of hardware stages that include a computing stage, a suspending stage, and a resuming stage. Each cycle of the hardware pipeline can concurrently execute a respective distinct stage of the sequence of hardware stages for a respective distinct thread. A read of random access memory (RAM) can be requested for a thread only during the suspending stage. While a previous state of a finite state machine (FSM) that implements a coroutine of the thread is in the suspending stage, a read of RAM is requested, and the thread is unconditionally suspended. While the coroutine of the thread is in the resuming stage, an asynchronous response from RAM is correlated to the thread and to a next state of the FSM. While in the computing stage, the next state of the FSM executes based on the asynchronous response from RAM.

20 Claims, 5 Drawing Sheets (56) References Cited

OTHER PUBLICATIONS

Kim et al., "BionicDB: Fast and Power-Efficient OLTP on FPGA", in Proceedings of the 22nd International Conference on Extending Database Technology, dated Mar. 2019, 12 pages.

Jonathan et al., Exploiting Coroutines to Attack the "Killer Nanoseconds", in Proceedings of the VLDB Endowment, vol. 11, No. 11, DOI: 14778/3236187.3236216, dated Jul. 2018, 13 pages.

He et al., "CoroBase: Coroutine-Oriented Main-Memory Database Engine", in Proceedings of the VLDB Endowment, vol. 14, No. 3, DOI: 10.14778/3430915.3430932, dated Oct. 2020, 14 pages.

HARDWARE-ACCELERATED COROUTINES FOR LINKED DATA STRUCTURES

FIELD OF THE INVENTION

The present invention relates to hardware accelerated pointer chasing. Herein are techniques for using memory asynchrony to avoid hardware pipeline stalls.

BACKGROUND

With growing density of random access memory (RAM), memory-optimized linked data structures, such as tree indexes, skip lists, and hash table, are playing an increasingly important role for in-memory data processing. For example, in-memory database systems may implement a wide variety of memory-optimized indices as important system components. Most linked data structure traversal algorithms entail extensive pointer chasing, which may entail dereferencing a first pointer to obtain a second pointer as needed to traverse a fragmented data structure. Pointer chasing is also known as dependent pointer dereferencing because every step of pointer computation and pointer usage takes place in serial due to data dependency between pointers. However, execution by a central processing unit (CPU) is bound by memory latency whenever a cache miss occurs during dependent pointer chasing. That causes poor utilization of memory bandwidth and potentially huge wastes of CPU cycles. Multicore parallelism is a popular way for improving memory utilization, but multicore is expensive in terms of silicon efficiency (e.g. performance per watt) because each CPU core is power-hungry even when heavily underutilized. This is especially concerning when coping with a high volume of index lookups, which is a dominant workload characteristic in online transaction processing (OLTP) database applications.

Despite the potential for increased efficiency, there are several limitations in software-only solutions. First of all, it is still very difficult to prevent memory stalls with software coordination. Software typically issues a prefetching request for desired data, suspends itself, and unconditionally resumes at a predetermined time, expecting that the data has arrived by that time. If the expectation of data delivery is not met, a resuming computational thread cannot proceed until a memory has fully responded. In the meantime, other concurrent threads may also be delayed, even though some of them are ready to continue, because the CPU is stalled using memory. Especially with non-uniform memory access (NUMA) hardware where memory latency varies, it is even more difficult to predetermine a schedule that can prevent memory stalls. Second, software implementation of thread scheduling has context switching overhead and serializes compute tasks, both of which decrease throughput. Although thread scheduling may sometimes have a smaller latency than the latency of a single memory stall, thread scheduling exhibits some unavoidable overhead between every context switch. Lastly, the parallelism of software multithreading is ultimately bound by the size of an instruction window (i.e. time slice) which has not increased despite decades of CPU evolution. This implies that software scheduling is expected to improve at a very slow pace in future.

The following are unsolved technical challenges in the state of the art. There are frequent memory stalls during linked data structure operations such as traversal. There is suboptimal interleaving of concurrent threads that causes problems such as starvation and priority inversion. The context switching overhead of software scheduling is excessive and always occurring. Herein, these problems are solved not with software, but with novel hardware in cooperation with special software techniques.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is a coroutine-aware hardware accelerator for optimal interleaving of computational threads. A coroutine is logic that can be temporarily suspended (including preservation of local data) at one or more unconditional suspension points that are designated in the logic itself, which is different from preemptive multitasking that may interrupt logic at any arbitrary point based on criteria external to the logic such as expiration of a time slice or invocation of a higher priority thread or an interrupt handler.

This hardware approach entails two main techniques: 1) stall-free execution pipelining that facilitates starting or resuming a coroutine every cycle and 2) efficient and flexible coroutine scheduling that can eliminate memory stalls and context switching overhead. A benefit is that a novel hardware pipeline can issue a memory request every single cycle, overcoming memory latency in a power-efficient way. This characteristic makes hardware execution pipelining an attractive compute resource for emerging near-data processing, in which the data arrives over-the-wire or from bulk memory, where power consumption is very restrictive.

Herein, various embodiments may use the following components in the following ways. Finite state transducers (FSTs) or finite state machines (FSMs) operate on linked data structures such as:
- hash table insert/probe/update/delete,
- B+ tree insert/lookup/update/delete/scan, and
- Skip list insert/lookup/update/delete/scan.

The hardware approach may entail any of the following activities.

Accepting a client request,
Thread scheduling,
Context switching,
Execution of an FST state by a single state transition,
Thread context initialization,
Thread context save and restore,
Tracking of active threads,
Memory interfacing to underlying memory subsystem, including issuing read, write, and atomic memory request, and
Receiving and processing memory responses.

Each FST herein is a hardware-mapped coroutine that implements a specific operation of a linked data structure such as a hash table insert. With automation herein, users are not responsible for mapping an application coroutine into an FST, which the automation does by dividing a linked data structure operation into multiple FST states according to different application memory accesses and by defining state transitions between those states. With reusable coroutine infrastructure provided herein, programmers can focus on mapping a linked data structure lifecycle to FSTs. FSTs may implement lock-free algorithms as to run multiple operations concurrently. In an embodiment, a memory interface module provides atomic operations to support lock-free algorithms.

A memory interface herein is a hardware logic layer for interacting with an underlying memory subsystem. The memory interface provides a mechanism for issuing read/write/atomic requests and asynchronously receiving a corresponding memory response. The memory interface can be connected to multiple memory subsystems across different memory media such as dynamic RAM (DRAM), persistent memory (PMEM), and remote memory via remote direct memory access (RDMA). The memory interface provides a single unified interface for execution hardware. With this memory interface: 1) a memory request can be made each cycle of a hardware pipeline, 2) memory responses can be received and processed out-of-order, and 3) a thread handle is available as a part of memory transaction for pairing request and response.

This approach entails deep pipelining so that multiple coroutine threads can be processed simultaneously across pipeline stages. This approach eliminates pipeline stalls to ensure that threads advance to a respective next pipeline stage every cycle of the hardware pipeline. As a result, the hardware pipeline can either start a new thread or resume a waiting thread each cycle, which facilitates promptly resuming a coroutine thread to process data recently returned from memory. Coroutine scheduling herein is flexible so that suspended threads can be resumed in the ordering of their memory responses, even if the responses arrive out-of-order. Hardware coroutines herein differ from software coroutines with which scheduling typically is inflexible, which can cause inefficiencies. For example, inflexible scheduling of software coroutines may stall a CPU until an expected memory response arrives.

Prevention herein of a pipeline stall occurs as follows. First, an asynchronous hardware connection is used for communication between the hardware pipeline and external modules. Asynchrony plays an important role in preventing a pipeline stall because asynchrony decouples the hardware pipeline from high-latency external modules that otherwise would cause backpressure that decreases throughput. Second, interaction with external modules, such as memory read/write, context restore/save, and context allocation/deallocation are designed to complete in a single pipeline stage.

In an embodiment, there are multiple identical hardware pipelines for inelastic scaling managed by an embedded load balancer. Because each hardware pipeline can access any of the application address space (e.g. for a shared-everything database), there is no restriction on which client requests should be forwarded to which hardware pipeline. The load balancer monitors the occupancy (i.e. the number of threads running) of each hardware pipeline and forwards an incoming request to any hardware pipeline having the lowest occupancy. In an embodiment, different hardware pipelines are specialized for different FSTs (e.g. separate hash table index hardware pipelines and B+ tree hardware pipelines), and the load balancer should forward a request to a corresponding hardware pipeline based on the kind of request.

In an embodiment, a computer assigns many threads to a hardware pipeline that contains a sequence of hardware stages that include a computing stage, a suspending stage, and a resuming stage. Each cycle of the hardware pipeline can concurrently execute a respective distinct stage of the sequence of hardware stages for a respective distinct thread. A read of a random access memory (RAM) can be requested for a thread only during the suspending stage. While a previous state of a finite state machine (FSM) that implements a coroutine of the thread is in the suspending stage, a read of the RAM is requested, and the thread is unconditionally suspended. While the coroutine of the thread is in the resuming stage, an asynchronous response from the RAM is correlated to the thread and to a next state of the FSM. While in the computing stage, the next state of the FSM executes based on the asynchronous response from the RAM.

1.0 Example Computer

Figure 1:
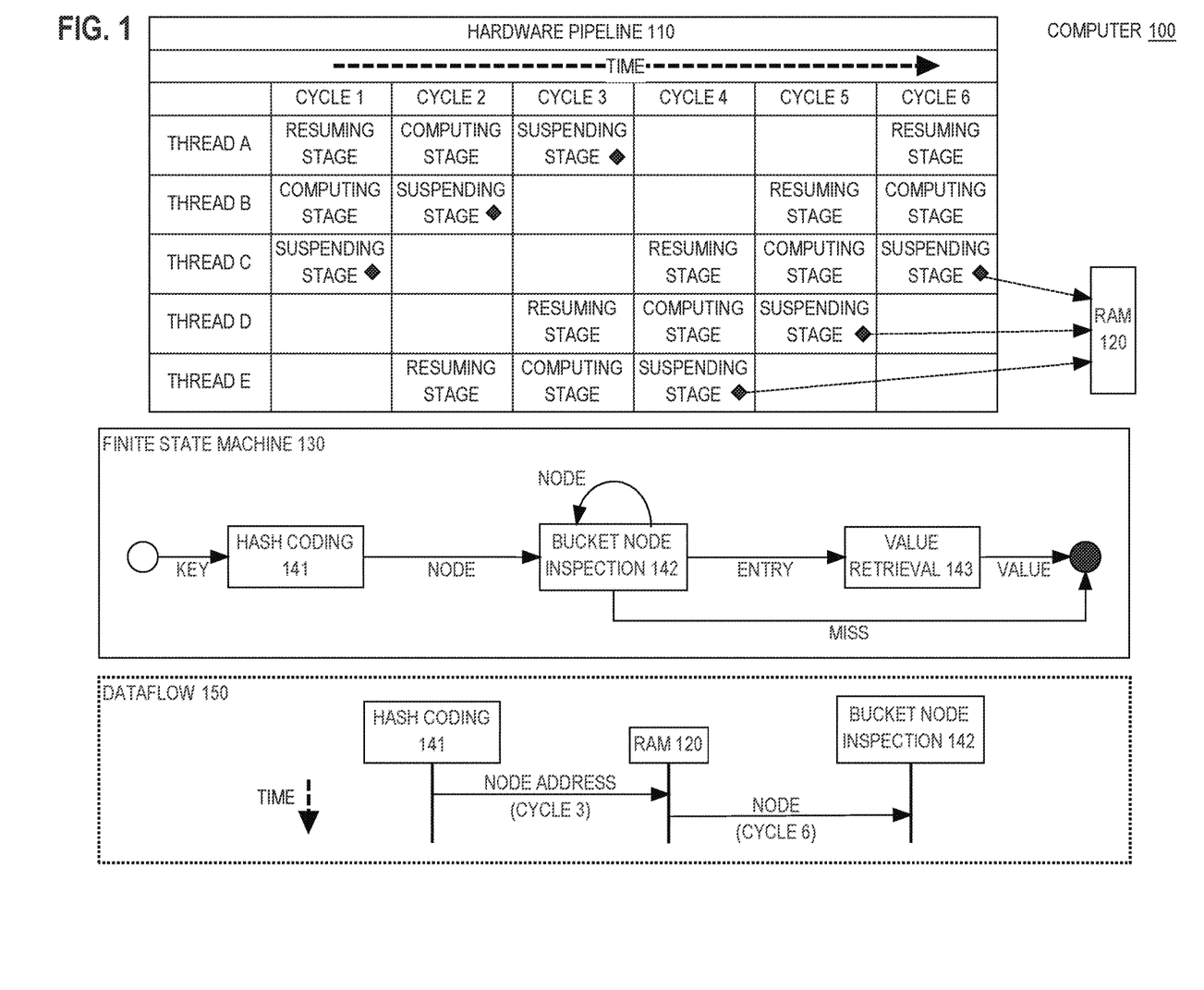
FIG. 1 is a block diagram that depicts an example computer that provides hardware accelerated pointer chasing by using random access memory (RAM) asynchronously to avoid stalls in a hardware pipeline.

FIG. 1 is a block diagram that depicts an example computer 100, in an embodiment. Computer 100 provides hardware accelerated pointer chasing by using random access memory (RAM) 120 asynchronously to avoid stalls in hardware pipeline 110. Computer 100 may be one or more of a rack server such as a blade, a personal computer, a mainframe, a virtual computer, or other computing device.

As indicated by the dashed bold horizontal arrow shown in hardware pipeline 110, time flows from left to right as a sequence of hardware cycles 1-6 elapse. All cycles 1-6 have a same fixed duration. In an embodiment, cycles 1-6 are respective hardware clock cycles in an integrated circuit.

1.1 Hardware Pipeline Cycles and Stages

To provide pipeline concurrency, hardware pipeline 110 contains a sequence of at least three pipeline stages that are a resuming stage, a computing stage, and a suspending stage that have distinct behaviors for respective distinct purposes. In each of cycles 1-6, all pipeline stages should completely and concurrently operate.

Computer 100 may host multiple concurrent execution contexts such as execution threads A-E. Each thread may be in at most one respective distinct pipeline stage per cycle. Each pipeline stage operates for one respective distinct thread per cycle. For example during cycle 2: thread A is in the computing stage; thread B is in the suspending stage; and thread E is in the resuming stage.

1.2 Memory Interface and Latency

Random access memory (RAM) 120 is external to hardware pipeline 110. In various embodiments, RAM 120 may be: a) external to computer 100, b) separated from hardware pipeline 110 by a backplane or system bus, c) in an integrated circuit chip that does not contain hardware pipeline 110, or d) in an electronic circuit that does not receive clock signals that indicate cycles 1-6. For example even though a system on a chip (SoC) may contain hardware pipeline 110 and RAM 120, hardware pipeline 110 and RAM 120 may operate without sharing a clock signal.

In a rack embodiment, computer 100 may be one card in the rack, and RAM 120 may reside on a different card in the rack. In a distributed embodiment such as a Beowulf cluster or a datacenter, computer 100 and RAM 120 may be separated by one or more network switches or hubs.

Latency of RAM 120 exceeds one cycle such that a request to read RAM 120 will not be fulfilled by RAM 120 in an immediately next cycle. In any cycle, some of threads A-E may wait for RAM 120 to answer respective read requests, which is shown in hardware pipeline 110 as any of the empty tabular boxes. For example during cycle 3, threads B-C await data from RAM 120. In an embodiment, the latency of RAM 120 sometimes or always exceeds three cycles.

Requests to read RAM 120 are shown in hardware pipeline 110 as small black diamonds. Although RAM 120 may have a backlog of multiple unfulfilled read requests from different threads, only one new read request may occur in each of cycles 1-6. For example as shown by a dotted diagonal arrow, thread E is the only thread to request a read of RAM 120 during cycle 4.

1.3 Computing Pipeline Stage and Pointer Chasing

The respective functionalities of the pipeline stages are as follows, with demonstrative respect to thread B. In cycle 1, thread B is in the computing stage. Thread B is not new in cycle 1 because, as discussed later herein, a thread should begin execution only in the resuming stage that, although not shown, previously occurred at least once already for thread B in cycle(s) before cycle 1.

While in the computing stage and as discussed later herein, thread B may execute thread specific hardware logic of a software application. Depending on the embodiment, that hardware logic may be contained in custom circuitry such as a field programmable gate array (FPGA) or an application specific circuit (ASIC). In other words, the hardware logic is not based on an instruction set architecture (ISA). The custom circuitry also contains hardware pipeline 110, but not RAM 120.

Such hardware logic is designed to fully execute in one cycle. Application hardware logic should be entirely computational and, in most cases as discussed later herein, should at least compute a pointer to and size of a datum (e.g. a byte, a machine word, or a contiguous multiword data structure) to retrieve from RAM 120. In other words, the computing stage may compute a pointer to be chased.

Herein, pointer chasing means computing and dereferencing a pointer to a part of an incontiguous (i.e. fragmented) data structure that does not support random access because offsets to elements in the data structure are unpredictable. For example, accessing a particular node in a linked list may entail iteratively traversing multiple nodes of the list until reaching the particular node. Pointer chasing is inherently sequential and slowed by memory latency.

1.4 Memory Request and Suspending Pipeline Stage

For example during the computing stage in cycle 1, thread B may compute a pointer to a next node in a linked list. Adjacent and subsequent to the computing stage is the suspending stage that: a) submits a read request that contains the computed pointer and datum size (e.g. of a next node in a linked list) to RAM 120, and b) suspends thread B until RAM 120 fulfills the read request. For example during the suspending stage of cycle 2, the read request is sent for thread B and thread B is suspended. As explained later herein, a request may read, write, or both, and all of these are demonstratively discussed as read requests. Herein, a write request may occur wherever a read request is discussed. Generally, a read request herein may be an access request of various other kinds discussed herein.

In cycles 3-4, thread B waits while suspended until the read request is fulfilled. In a state of the art hardware pipeline, such waiting causes a stall or bubble in the pipeline, which entails some pipeline stage(s) idling (i.e. not operating) in some cycle(s). Instead herein, thread B is evicted from hardware pipeline 110 until the read request is fulfilled, which avoids stalling.

1.5 Memory Response and Resuming Pipeline Stage

Computer 100 may maintain a backlog of ready threads that are neither suspended nor in hardware pipeline 110. A ready thread may be scheduled to enter (e.g. reenter) hardware pipeline 110 to replace an evicted thread. For example during cycle 2, thread B may become suspended and thread E may concurrently enter or reenter hardware pipeline 110 in the resuming stage.

Eventually RAM 120 fulfils the read request of thread B, which may immediately or eventually cause thread B to reenter hardware pipeline 110 in the resuming stage. In the shown scenario during cycle 4, RAM 120 sends a response that contains the datum requested by thread B, and thread B reenters the resuming stage in immediately next cycle 5. In another scenario during cycle 4, RAM 120 sends a response that contains the datum requested by thread B, but computer 100 has a backlog that prevents thread B from immediately reentering hardware pipeline 110.

For example, computer 100 may have a first backlog (e.g. queue) of unprocessed responses from RAM 120 for other suspended threads, and/or computer 100 may have a separate second backlog of new threads. Scheduling of threads to enter/reenter hardware pipeline 110 is referred to herein as admission control which, due to concerns such as starvation or priority inversion, may or may not impose various heuristics such as ordering (i.e. fairness) and priority. In an embodiment, threads have respective priorities, and both backlogs are priority queues.

Generally, starvation is avoided due to fairness provided by hardware pipeline 110. For example, resource contention by racing threads is avoided because the pipeline stages cause the threads to take turns with contentious resources such as memory and processing time.

In an embodiment, the first backlog of unprocessed responses from RAM 120 always has priority over the second backlog of new threads, in which case, a new thread from the second backlog may enter hardware pipeline 110 only when the first backlog is empty, which helps prevent starvation. Other reasons for such de-prioritization of new threads are discussed later herein.

In addition to backlog(s), RAM 120 may have variable latency. In one example, RAM 120 is shared by other computers or other programs of computer 100, which may cause fluctuating congestion. Another example is non-uniform memory access (NUMA), in which RAM 120 is a composite of different memories with different respective latencies. For example, some or all of RAM 120 may be available only by remote direct memory access (RDMA).

In one example, thread E becomes suspended in cycle 4 but, due to memory latency or a admission control backlog, tens of cycles may elapse before thread E can reenter hardware pipeline 110, which may occur without any stall/bubble in hardware pipeline 110 because other threads may enter/reenter hardware pipeline 110 to fill any vacancy left by evicting suspended thread E.

1.6 Application Logic, Finite State Machines, and Threads

Hardware pipeline 110, its stages, and execution contexts for threads are reusable hardware resources that may be used by any mix of application specific kinds, purposes, and behaviors of threads A-E. However, any particular thread may have its own special logic and behavior. Regardless of the special natures of each of threads A-E, each thread has an associated instance of a finite state machine (FSM), such as FSM 130, that provides the stateful logic of the thread.

An FSM has an entry point, a (e.g. cyclic) control flow graph of states, and one or more termination points. The entry point of FSM 130 is shown as a white circle. The states of FSM 130 are shown as boxes. Transitions between states are shown as directed arrows. The termination point of FSM 130 is shown as a black circle.

In this example, FSM 130 has a somewhat linear control flow from left to right. For streamlined demonstration, states 141-143 of FSM 130 are initially discussed as if they were not specialized states. Later herein, special details of each state are discussed.

Multiple threads of a same kind may have multiple respective instances of a same FSM. Each instance of an FSM may have its own respective current state. Two instances of a same FSM may concurrently be in a same or different states. For example, threads A-B may both concurrently be in state 142, or thread A may be in state 142 while thread B is in state 141.

When thread A is new, its instance of FSM 130 waits in the entry point. When thread A enters the resuming stage during initial cycle 1, that instance of FSM 130 transitions to state 141. In the computing stage during next cycle 2, thread A executes the application specific logic of current state 141. The logic of any state of any FSM should compute two things in the following sequence: a) compute (but not execute) a transition to occur in the instance of FSM, and b) compute a pointer to chase.

That is, a state should not compute a pointer to chase until the state has determined what will be the next state. However, the pointer will be sent in a read request to RAM 120 before a transition to the next state actually occurs, even though the next state is already computed (i.e. determined) before sending the request.

In the suspending stage during next cycle 3, thread A dereferences the pointer being chased by requesting that RAM 120 read the datum addressed by the pointer, and thread A becomes suspended to wait for the datum in a later response from RAM 120. Eventually RAM 120 provides the datum in a response, and thread A reenters hardware pipeline 110 in the resuming stage during cycle 6, which is when thread A's instance of FSM 130 transitions from previous state 141 to already determined next state 142.

During cycle 7 (not shown) in the computing stage, thread A executes now current state 142. As thread A proceeds through various pipeline stages during various cycles, the instance of FSM 130 may visit or revisit various states until finally transitioning to the termination point of FSM 130.

When thread A in the computing stage of hardware pipeline 110 during any cycle computes the termination point as the next state, then the computing stage should also compute any value to be returned as a final result of the thread, if there should be a result. In that case, the suspending stage during the immediately next cycle performs any termination activity for the instance of FSM 130, including informing admission control and the pipeline scheduler that thread A has no next state as discussed later herein. In that case, thread A may be discarded, returned to a pool of idle threads that are specialized for FSM 130 (in which case, the instance of FSM 130 may later be reset to its own entry point), or returned to a pool of idle general purpose threads that are capable of running any of multiple different FSMs (in which case, the instance of FSM 130 may be discarded or dissociated from thread A for later resetting and reuse by another thread). In other words, FSM instances can be recycled somewhat independently of recycling threads.

In an embodiment, hardware pipeline 110 is connected only asynchronously to external components such as memory and client requests. Asynchrony and asynchronous memory are discussed throughout herein.

1.7 Hardware Coroutines

In an embodiment, each FSM implements a hardware coroutine. A coroutine is logic that can be temporarily suspended (including preservation of local data) at one or more unconditional suspension points that are designated in the logic itself, which is different from preemptive multitasking that may interrupt logic at any arbitrary point based on criteria external to the logic such as expiration of a time slice or invocation of a higher priority thread or an interrupt handler. Coroutine suspension is not based on conventional thread scheduling decisioning criteria such as thread priority, workload, or backlog aging. Resumption of a suspended coroutine eventually is asynchronously externally caused not by the coroutine itself, but instead by operation of hardware pipeline 110 and RAM 120.

Respectively for separate threads of a same kind, multiple instances of a same hardware coroutine correspond to multiple respective instances of a same FSM. Distinct coroutines are implemented by distinct FSMs.

The logic of a hardware coroutine is logically divided into portions that are separated by the one or more unconditional suspension points in the logic. Each distinct portion may be implemented as a distinct state in an FSM that implements the coroutine. A transition between states in the FSM implements a transition from one portion of the coroutine to a same or different portion. In an embodiment, a coroutine specified in source logic such as a hardware description language (HDL) is compiled to automatically generate an FSM that represents the coroutine.

1.8 Application Data Structures and Reusable Abstract Data Types

In an embodiment, FSMs operate stateful data structures (e.g. instances of abstract data types, ADTs) whose use entails repeated pointer chasing due to fragmented (i.e. incontiguous) storage of internal parts (e.g. data nodes) of the data structure in RAM 120. For example, the fragmented data structure may be a linked list, a logical tree or logical graph (e.g. property graph), a (i.e. probabilistic) skip list, or a hash table that contains incontiguous buckets. Advantages of a fragmented data structure include: a) no need for a monolithic memory chunk to store the whole data structure, b) no need to calculate the size of the data structure when constructing the data structure (e.g. a hash table may rebalance during initial populating or later), and c) resizable (e.g. dynamically add or remove a linked list node).

In an embodiment, an ADT may be operated by multiple different specialized FSMs (e.g. for multiple different specialized hardware coroutines). For example, an ADT may have: a distinct FSM to construct and initially populate an instance of the ADT, a distinct FSM to read the instance of the ADT (e.g. retrieve a linked list node), and a distinct FSM to modify the instance of the ADT (e.g. insert a linked list node).

In this example, FSM 130 is specialized to use a key to find a corresponding value in a hash table as follows. Each transition in FSM 130 is shown as an arrow with a respective label that denotes data that is provided with the transition. That data is injected into the next state (i.e. the target of the arrow) for the next state to use as an argument. The data may be a scalar or a complex data structure.

In this example, the datatype of transition data is fixed, predefined, and may differ for different transitions. For example, hash coding state 141 is: a) designed to be entered by a transition that always has a lookup key provided by an application specific caller in computer 100, and that caller is external to FSM 130 and external to thread A and external to hardware pipeline 110, and b) be exited by a transition that always returns a node of a hash table bucket that may be a linked list of nodes to accommodate duplicate keys or hash collisions on a key, and that node is computed and retrieved (i.e. pointer chased) by hash coding state 141.

Operation of hash coding state 141 is shown in dataflow 150 that is demonstrative (i.e. not actually stored in computer 100) as indicated by its dotted outline. When a caller invokes a hash table lookup with a provided key, admission control eventually schedules new (or recycled from a thread pool) thread A to enter hardware pipeline 110 in the resuming stage during cycle 1. The transition (bearing that key) from the entry point of FSM 130 to hash coding state 141 occurs during next cycle 2 in the computing stage of hardware pipeline 110, which executes hash coding state 141.

As explained above, an FSM state should compute (not execute) a transition to a next state before computing a pointer to chase. Hash coding state 141 has only one departing transition. Thus, bucket node inspection state 142 unconditionally is the next state.

Hash coding state 141 applies a hash function to the key to compute a hash code that is (or can be transformed into, such as by modulo, an array element count that is the bucket count) an offset into an array of hash buckets of the hash table. In other words, hash coding state 141 detects which bucket should the key be mapped to. Hash coding state 141 calculates (e.g. pointer math based on array offset and array base address) the address of the bucket in RAM 120, which is the address of the first node in the linked list that is the bucket.

1.9 Example Dataflow of Example State Transition

Dataflow 150 is shown as a scenario diagram (a.k.a. sequence diagram) of interactions between components 120 and 141-142. An interaction between two components is shown as a respective horizontal arrow. Such an interaction is not the same as a state transition in an FSM. For example, both interactions in dataflow 150 correspond to the same transition between states 141-142. As indicated by the dashed bold vertical arrow, time flows downwards, which implies a temporal ordering of the two interactions such that the earlier first interaction is shown higher than the later second interaction.

In the suspending stage of hardware pipeline 110 during cycle 3, the first interaction shown in dataflow 150 entails thread A sending to RAM 120 a read request containing the address (i.e. pointer to be chased as computed by hash coding state 141 as discussed above) of a first node in a bucket's linked list. Also during that suspending stage, thread A is suspended and evicted from hardware pipeline 110 as explained earlier herein. During subsequent cycles 4-5, thread A and dataflow 150 wait for the read request to be fulfilled.

Demonstratively, the first interaction is shown in dataflow 150 as directly invoked by hash coding state 141 during cycle 3 (i.e. the suspending stage of hardware pipeline 110). Technically, a thread instead only has direct causality during a computing stage of hardware pipeline 110. The other stages (e.g. suspending stage) of hardware pipeline 110 may use the pointer and/or transition computed by thread A, but without direct involvement of thread A. That is, the other stages of hardware pipeline 110 are FSM agnostic and do not execute thread/state specific logic. In other words, the first interaction shown in dataflow 150 is actually implemented by hardware pipeline 110 itself (on behalf of thread A) and not directly by thread A.

In the resuming stage of hardware pipeline 110 during cycle 6, the second interaction entails RAM 120 providing a response that contains a copy of the requested node of the bucket. Demonstratively, the second interaction is shown as directly engaging bucket node inspection state 142 such that thread A immediately enters the resuming stage of hardware pipeline 110 during cycle 6. In practice due to delays discussed earlier herein, that resuming stage of hardware pipeline 110 for thread A may be deferred until after cycle 6, such as cycle 7 instead or later. In any case, the resuming stage does not entail direct execution by thread A, but is instead performed by hardware pipeline 110 itself on behalf of thread A, similar to the suspending stage as discussed above.

In the computing stage of hardware pipeline 110 during cycle 7 (not shown), thread A executes the logic of bucket node inspection state 142 that computes a transition to a next state, which entails inspecting the contents of the copy of the bucket node to detect whether or not the node contains an entry for the key (that the instance of FSM 130 retained in volatile scratch memory in hardware pipeline 110. Unlike RAM 120, the scratch memory has negligible latency and can provide data in the same cycle that requests the data. Depending on the embodiment, hash coding state 141 may expressly initially save the key in the scratch memory, or the resuming stage of hardware pipeline 110 during cycle 1 may automatically save transition data (e.g. the key) from the entry point of FSM 130 into the scratch memory.

1.10 FSM Lifecycle

Bucket node inspection state 142 has multiple incoming transitions, which may come from distinct respective previous states. In an embodiment, the logic of an FSM state may detect which are the actual incoming transition and previous state. In any case, bucket node inspection state 142 computes a transition to a next state, which entails detecting whether the current bucket node does or does not contain the key. Bucket node inspection state 142 should select the transition from the three departing transitions shown, which correspond to a lookup hit, a lookup miss, or traversal to a next node in the bucket's linked list.

A hit may occur with any node in the linked list, in which case the selected transition's next state is value retrieval state 143. In that case, bucket node inspection state 142 computes a pointer/address of the value (e.g. database row) that corresponds to the key. For example, the entry itself in the current node may contain that pointer that, after chasing, eventually provides the value to value retrieval state 143. For example, value retrieval state 143 may receive a database row that contains multiple fields and compute a new value from one, some, or all of those fields. That computed new value is the shown transition value for FSM 130's termination point, which may be returned to an application specific caller (e.g. an executing query plan) as discussed earlier herein.

If bucket node inspection state 142 does not detect a hit in the current bucket node, then computing a transition to a next state further entails detecting whether the current node is the last node in the bucket's linked list. If the current node is not the last node, then bucket node inspection state 142 computes the address of the next node in the bucket's linked list. For example, the current node may contain a pointer to the next node in the linked list.

Traversal to the next node entails bucket node inspection state 142 selecting the self-directed transition, which is the one that causes repetition of bucket node inspection state 142 as shown. Thus, thread A uses its instance of FSM 130 to iteratively traverse the linked list, with each traversal from a previous node of the list to a next node taking multiple cycles, and a full traversal of the entire list taking many cycles. Hardware pipeline 110 compensates for such long latency of thread A by interleaving execution of other threads. Thus, the long latency does not cause a bubble/stall in hardware pipeline 110 nor a decrease in the throughput of hardware pipeline 110.

If bucket node inspection state 142 detects that there is no hit and that the current node is the last node in the linked list, then there is a miss. In that case, bucket node inspection state 142 selects the state transition to the termination point of FSM 130 as shown. A miss may operate the same as a hit, except that the returned final result value is: a) a null or other predefined special value and b) computed by bucket node inspection state 142 instead of value retrieval state 143.

In those ways, thread A (e.g. repeatedly) executes some or all of states 141-143 to perform a hash table lookup, no matter how little or much pointer chasing is involved. Each pointer chased causes a respective eviction and reentry of thread A from/to hardware pipeline 110.

2.0 Example Hardware Pointer Chasing Process

Figure 2:
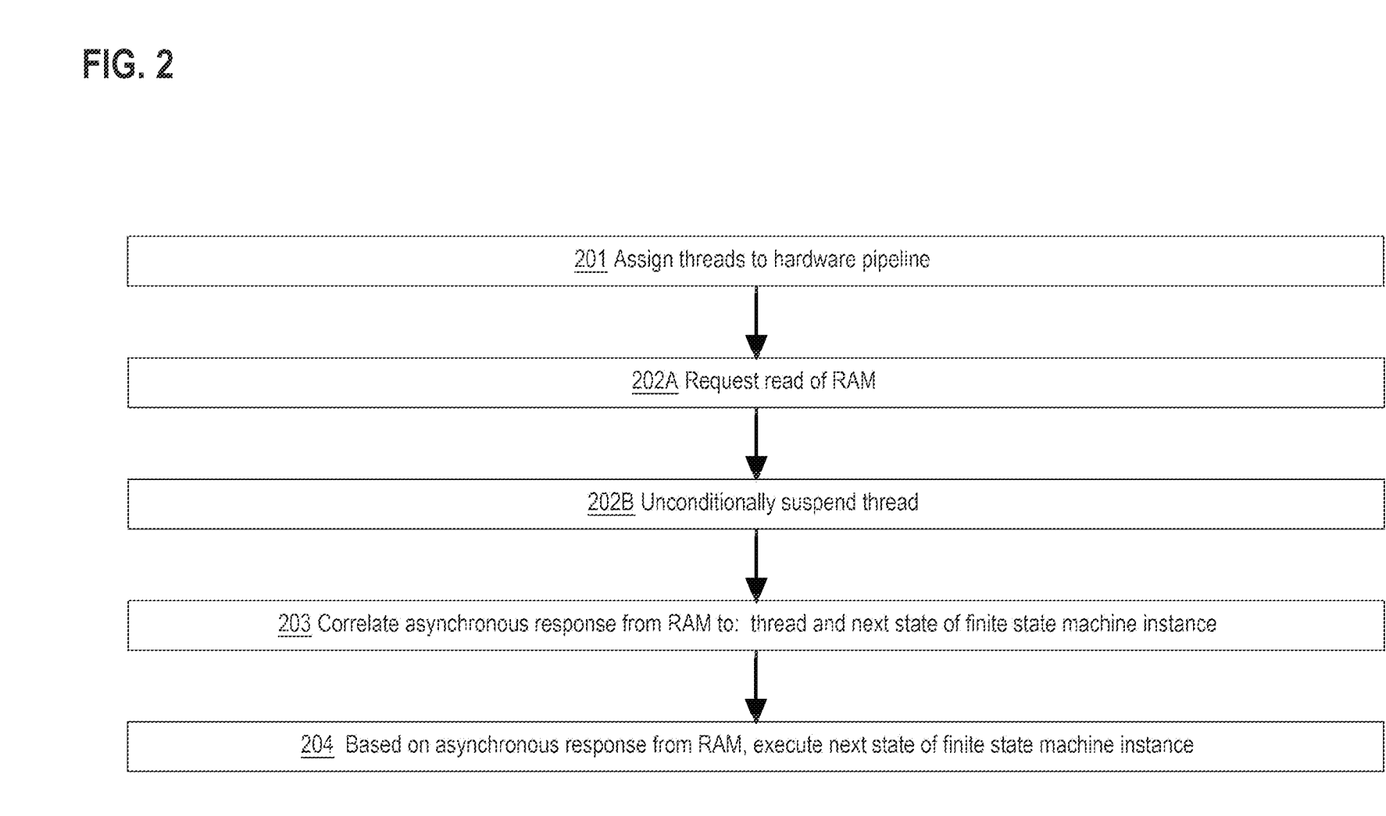
FIG. 2 is a flow diagram that depicts an example computer process that provides hardware accelerated pointer chasing by using RAM asynchronously to avoid stalls in a hardware pipeline.

FIG. 2 is a flow diagram that depicts an example process that computer 100 may perform to provide hardware accelerated pointer chasing by using random access memory (RAM) 120 asynchronously to avoid stalls in hardware pipeline 110, in an embodiment. FIG. 2 is discussed with reference to FIG. 1.

Step 201 is preparatory and assigns threads A-E to hardware pipeline 110. For example, a multithreaded query plan may have task parallelism, horizontally scaled parallelism, and/or streaming (e.g. software pipeline parallelism such as by so-called non-blocking plan operators, which is not the hardware pipeline parallelism of FIG. 1) for which computer 100 generates threads A-E.

For example, task parallelism causes threads A-B to concurrently process distinct respective relational tables to generates separate respective intermediate results (i.e. row sets) that may later be merged by a relational join or a relational union. Threads A-B may execute non-blocking plan operators that stream each individual row or batch of rows to a non-blocking relational join operator that thread C executes. Thus, thread C may be concurrent to threads A-B, which is software pipeline parallelism. Downstream of the join may be a non-blocking partitionable (i.e. horizontally scaled) filtration operator that threads D-E concurrently execute. Threads D-E may have respective instances of a same finite state machine (FSM). Threads A-C may each have an instance of a respective distinct FSM. Thus, this example has five threads, four kinds of FSMs, five instances of FSMs, and three kinds of software parallelism.

Assignment of threads A-E to hardware pipeline 110 does not necessarily mean that some or all of the threads immediately enter hardware pipeline 110. Instead admission control of a pipeline scheduler decides which thread enters during which cycle. Such decisions may be based on fluctuating factors discussed earlier herein. In any case, such decisions cannot ignore hard constraints imposed by the general or particular design of hardware pipeline 110. For example by general design, only one thread can enter the pipeline per cycle. By particular design, hardware pipeline 110 has a limit on how many active (i.e. not suspended) threads may hardware pipeline 110 simultaneously contain. For example in FIG. 1, that limit is three, which is why threads A-C have already entered hardware pipeline 110 during or before cycle 1, but threads D-E must wait until respective cycles 2-3 to enter hardware pipeline 110.

Remaining steps 202A-B and 203-204 are discussed with demonstrative respect to thread C. During cycle 1 in the suspending stage of hardware pipeline 110 for thread C, steps 202A-B may occur in either ordering or concurrently, depending on the embodiment. Although a thread computes a pointer to be chased during the computing stage of hardware pipeline 110, steps 202A-B are instead performed by the suspending stage that, as explained earlier herein, is an operation of hardware pipeline 110 on behalf of a thread, and not by the thread itself. For example, step 202B may suspend the thread before step 202A sends the read request to RAM 120.

In an embodiment, hardware pipeline 110 has a context table that contains an entry for each thread, whether active or suspended, that was assigned to hardware pipeline 110 such as by above step 201. Each entry in the context table identifies a distinct thread and its status (e.g. active or suspended, which respectively indicate that the thread is or is not currently in hardware pipeline 110). The structure, contents, and use of the context table are discussed later herein.

Step 202B is unconditional by hardware operation of hardware pipeline 110 and is not based on conventional thread scheduling decisioning criteria such as thread priority, workload, or resource availability. For example even if hardware pipeline 110 has capacity for three active threads but actually contains only one thread, then when the thread reaches the suspending stage of hardware pipeline 110, the thread is unconditionally evicted, which may mean that the ongoing thread is suspended or, if the thread has reached the termination point of its FSM, then the thread is discarded or returned to an idle pool.

Unconditional eviction of a requesting thread also occurs during a write request, even though RAM 120 need not send a response to the write request. After eviction, the writing thread is immediately eligible to be scheduled to (immediately or eventually) reenter the hardware pipeline according to admission control. For example if the writing thread is the only thread (i.e. no other active or suspended threads) in the context table of the hardware pipeline, then that thread can be in the suspending stage of the hardware pipeline during a previous cycle and, during a next cycle that is adjacent to the previous cycle, be in the resuming stage of the hardware pipeline. In other words in that case, eviction and reentry may occur in adjacent cycles for the writing thread.

As explained earlier herein, a read request that consists essentially of a thread handle, a pointer, and an express or implied datum size (e.g. byte count). A write request likewise contains a handle and a pointer but, instead of a datum size, contains a copy of the datum.

In an embodiment, a request may be for a read and write of a same address, such as according to an atomic memory operation such as test-and-set, fetch-and-add, or compare-and-swap. In that case, the requesting thread will be suspended to await a response from RAM 120 in a same way as if the request were an ordinary read request.

As discussed earlier herein, hardware pipeline 110 is physically connected but operationally decoupled from RAM 120 such that responses from RAM 120 are asynchronous, which means that a count of wait states cannot be decided when a read request is sent due to factors discussed earlier herein. Asynchrony may cause multiple read requests to have their respective responses occur in an ordering that does not reflect the ordering of the read requests.

Step 203 can accommodate an out of order response from RAM 120, and an arbitrary ordering of responses does not affect step 203. During cycle 4 in the resuming stage of hardware pipeline 110 for thread C, step 203 correlates an asynchronous response from RAM 120 to the thread that made the read request and to the next state of the FSM instance of that thread.

As discussed earlier herein, hardware pipeline 110 has a context table that contains an entry for each thread, whether active or suspended, that was assigned to hardware pipeline 110 such as by above step 201. In an embodiment, the context table is an array whose integer offsets of entries (i.e. array elements) may be used as respective handles of all threads in the context table. For example with a small context table, a thread handle may be a machine word, a byte or even less than eight bits.

As explained earlier herein RAM 120 is not itself a plain memory bank, and may even be a composite of other memories. That is, RAM 120 is a memory interface that operates as a façade, in which case RAM 120 may have behaviors not typical of a memory chip. For example: a) a read request may contain the handle of the requesting thread, b) RAM 120 may temporarily retain the handle while processing the read request, and c) the response from RAM 120 that fulfils the read request also contains the handle (along with the retrieved datum).

Thus, step 203 may use the handle from the response to correlate (i.e. reference an entry that is an array element in the context table) the response to thread C and to the next state of thread C's FSM instance. For example, each entry in the context table may contain references (e.g. pointers or identifiers) or indicators (e.g. flags) of any of: the instance of the FSM, the kind of FSM, the next state of the instance of the FSM, the pointer being chased as computed by the previous state of the instance of the FSM, the status of the thread (e.g. whether the thread is suspended or active and, if so, which pipeline stage is the thread in), and whether or not the context table entry is in use (i.e. actually corresponds to a thread, for example there may be empty entries because there may momentarily be more entries than threads). As explained earlier herein, hardware pipeline 110 has a fixed capacity of active threads (three in FIG. 1), which should be much less (e.g. by some multiple) than the capacity of the context table to prevent a stall/bubble in hardware pipeline 110.

For example, admission control should place a new thread in a backlog if the context table is currently full, or the software application (e.g. database management system, DBMS) should keep a count of how many threads are assigned to hardware pipeline 110 and never exceed the capacity of the context table, even though the DBMS does not know which of those threads are active and which are suspended. In an embodiment, the context table resides in volatile scratch memory of hardware pipeline 110 that is fast as discussed earlier herein. An embodiment may prevent access to some or all of the scratch memory by a software application, by the DBMS, and possibly even by active threads in hardware pipeline 110. For example, respective portions of the scratch memory may be assigned to each thread, each kind of FSM, each FSM instance, or even each FSM state, and access to other than those respective portions may be forbidden except by hardware pipeline 110 itself.

In an embodiment, step 203 is delayed and is not an immediate reaction to the response from RAM 120. For example, hardware pipeline 110 may have a queue of responses received from RAM 120 for various threads, and step 203 does not occur for thread C until the response for thread C is eventually dequeued. For example, RAM 120 may be a façade for multiple memory banks, or a memory bank may have multiple ports, and so hardware pipeline 110 may receive multiple responses during a same cycle. Because only one thread can reenter hardware pipeline 110 in each cycle, the queue buffers any response that hardware pipeline 110 is unready for, such as multiple simultaneous responses or even a single response if the queue is not empty. In any case, step 203 uses the context table entry of thread C to identify the previously determined next state of the FSM instance of thread C.

Based on the asynchronous response from RAM 120, during cycle 5 in the computing stage of hardware pipeline 110 for thread C, step 204 executes the next state of the FSM instance of thread C as discussed earlier herein. Thus, the process of FIG. 2 provides execution of only one state (i.e. that next state). In other words, the process of FIG. 2 does not necessarily reach the termination point of thread C's instance of its FSM, and thus does not complete all of the work of thread C. Steps 202A-B and 203-204 may be repeated to execute other states for thread C or other threads, for example as needed to cooperatively and fully execute the multithreaded query plan discussed above for step 201. Multithreading, asynchrony, and an out of order response are discussed below in more detail with FIG. 3.

Figure 3:
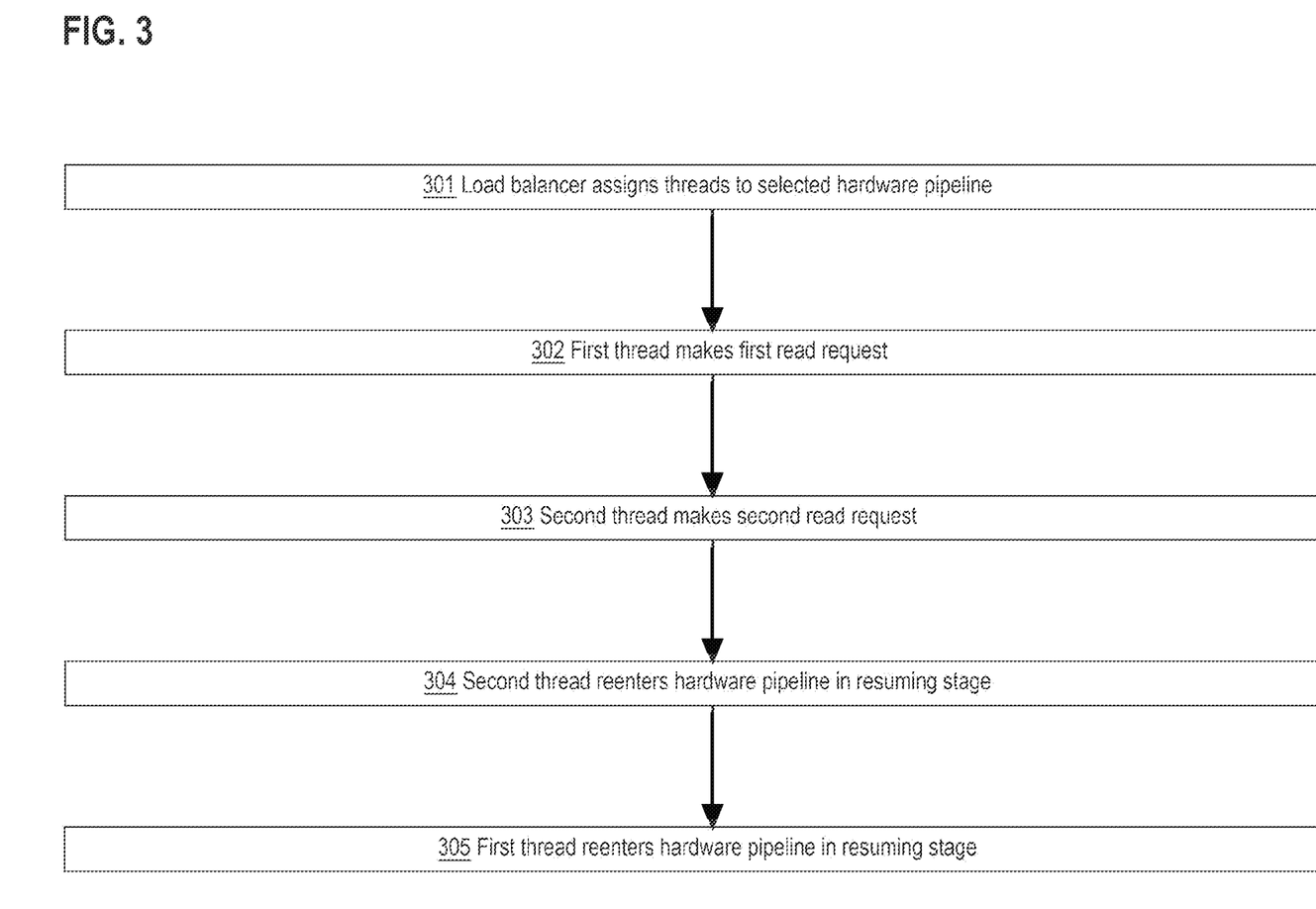
FIG. 3 is a flow diagram that depicts an example computer process that accommodates multithreading, asynchrony, and an out of order response.

3.0 Example Activities for Multithreading, Asynchrony, and Out of Order Response FIG. 3 is a flow diagram that depicts example activities that an embodiment of computer 100 may perform to accommodate multithreading, asynchrony, and an out of order response. The steps of the processes of FIGS. 2-3 are complementary and may be combined or interleaved. FIG. 3 is discussed with reference to FIG. 1.

Although not shown in FIG. 1, computer 100 may contain multiple hardware pipelines of same or different capacity and same or different specialization. For example, some hardware pipelines may support floating point arithmetic. Qualitative (e.g. specialization) and quantitative (e.g. capacity) aspects of hardware pipelines may be configurable during a hardware design phase. Capacity of the context table of a hardware pipeline may be adjusted during design (i.e. before circuit fabrication) to accommodate an expected workload. Likewise, counts (i.e. parallelism) and specialties of hardware pipelines may be adjusted during design based on expected workload.

In step 301, a load balancer assigns threads to a hardware pipeline that the load balancer selects. Depending on the embodiment, computer 100 may contain the load balancer and/or the load balancer may be on a same computer card (i.e. printed circuit board) or same integrated circuit chip (e.g. system on a chip, SoC) as the hardware pipelines. To create a new hardware pipeline thread on demand, step 301 may select a hardware pipeline for the new thread based on: a) static aspects of the hardware pipeline such as specialized functionality such as floating point math that is needed based on the kind of new thread and b) dynamically fluctuating conditions among all hardware pipelines such as a highest count of unused entries in a context table or a highest count of stalled pipeline cycles in a fixed period of many cycles.

In another example of static hardware criteria for step 301, different hardware pipelines may have different respective limits on how many distinct kinds of FSMs, which kinds of FSMs or kinds of abstract datatypes (ADTs as discussed earlier herein), how many states or transitions per FSM, how much logic per state, and how long is a cycle (which may limit how much work per state). In any case, if a request specifies creating multiple new threads of same or different kinds, then the load balancer may or may not assign all of those new threads to a same hardware pipeline.

Remaining steps 302-305 accommodate multithreading, asynchrony, and an out of order response. Steps 302-305 are discussed for a demonstrative count of two threads in a same hardware pipeline. In this example, both threads are active (i.e. actually in the hardware pipeline), which means neither thread is new or suspended. In other examples, new threads may enter or existing threads may reenter the hardware pipeline in various cycles.

In step 302 in the suspending stage of the hardware pipeline during a first cycle, a first thread sends a first read request to RAM 120, and the first thread becomes suspended.

In step 303 in the suspending stage of the hardware pipeline during a second cycle that is adjacent (i.e. immediately after) to the first cycle, a second thread sends a second read request to RAM 120, and the second thread becomes suspended. Respective read requests from two threads during adjacent cycles demonstrates that the hardware pipeline can send a read request each cycle. In other examples, the first and second cycles are not adjacent, which does not alter subsequent steps 304-305.

Respective responses that fulfil those read requests may arrive at same or different cycles and in a same or different ordering, which may delay or break a state of the art pipeline. In this example, the hardware pipeline does not need to buffer and defer processing an out of order response until all responses for earlier read requests are received and their threads resumed. In other words, the hardware pipeline does not need to reimpose an expected ordering by reordering responses.

Thus if a response to the second read request arrives out of order (i.e. before a response to the first read request), the second thread may be resumed before the first thread. In step 304, the second thread reenters the hardware pipeline in the resuming stage while the first thread is still suspended and waiting for a response.

Eventually, the response to the first read request arrives. In step 305 and after the second thread resumes, the first thread reenters the hardware pipeline in the resuming stage. Depending on the scenario, resumption of first and second threads does or does not occur during adjacent respective cycles. That is, in addition to being able to send a separate read request in the suspending stage each cycle, a separate thread may enter or reenter the hardware pipeline in the resuming stage during each cycle.

4.0 Exemplary Embodiment

The following exemplary embodiment is based on embodiments presented earlier herein. Design choices demonstrated by this exemplary embodiment are not limitations on the embodiments presented earlier herein.

Client (i.e. application) requests are queued in a system input queue, and the execution engine (i.e. managed set of one or more hardware pipelines) initiates execution of a new request only if there is an available context entry and there is no memory response returning in the given cycle. Once a new request enters the system, the execution engine creates a thread and its context by sending allocation and initialization requests to the context manager and receives a context identifier (ID) in the next cycle.

A context manager is circuitry within a hardware pipeline that uses a context table to track active threads that are in the hardware pipeline and suspended threads that are evicted from the hardware pipeline and awaiting a memory response. For retrieving the context from the context manager, the context ID is used to tag further memory requests/responses and referenced across states. For resuming a thread upon arrival of its memory response, the context manager extracts the context ID from the memory response, retrieves the corresponding context entry from the context table, and keeps a copy of the context entry in a register. Any modification to the context, including a computed state transition, is made to the register copy, not to the original context table entry. When the thread is being suspended, the context manager stores the copy of the context entry back into the context table.

The context manager uses the context table to store and manage the contexts of active threads. A context entry is exclusively held during the lifecycle of an associated thread. The context table can maintain up to N (i.e. depth of the context table) contexts, where N should be sufficiently large to maximize parallelism and limited by integrated circuit manufacturing or design concerns such as material cost, manufacturing yield, and circuit signaling scalability. The size (i.e. width of the context table) of a context entry in a context table is fixed and set to a maximum uniform width across FSTs.

The width and depth of the context table are compile-time constants when compiling hardware description language (HDL) discussed earlier herein. For low-latency context switching, the context table resides in an on-chip memory medium, such as so-called block random access memory (RAM) of a field programmable gate array (FPGA), so-called lookup table (LUT, i.e. truth table) RAM of an FPGA, or expensive and very fast static RAM (SRAM). The context manager provides hardware functionalities to the execution engine such as context allocation/initialization for creating a new thread for a new client request, context deallocation upon completion of a thread, context save for suspending a thread, and context restore for resuming a thread.

The context manager keeps track of context entry allocation status using a bitmap register where each bit indicates whether the corresponding context entry in the context table has been allocated or not. Upon an allocation request from the execution engine, the context manager scans the bitmap, marks (i.e. sets) the bit of an unused context entry, and returns a context ID which is an address or offset of the context entry in the context table. A deallocation request containing a context ID causes the corresponding bit to become unmarked (i.e. cleared). If both allocation and deallocation requests by different threads occur for a same context entry during a same cycle, the context ID is reused for the allocation request.

5.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

5.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
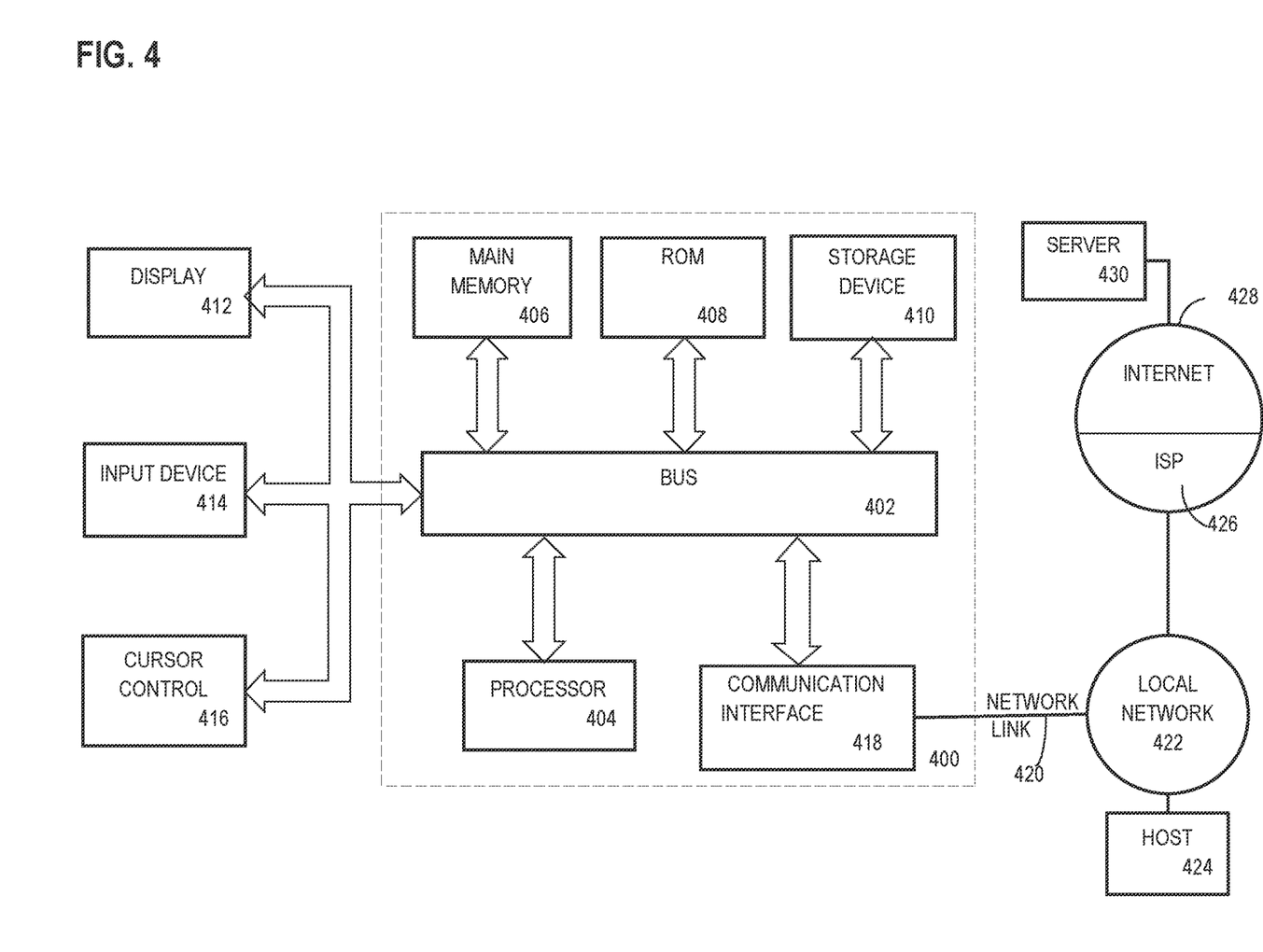
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
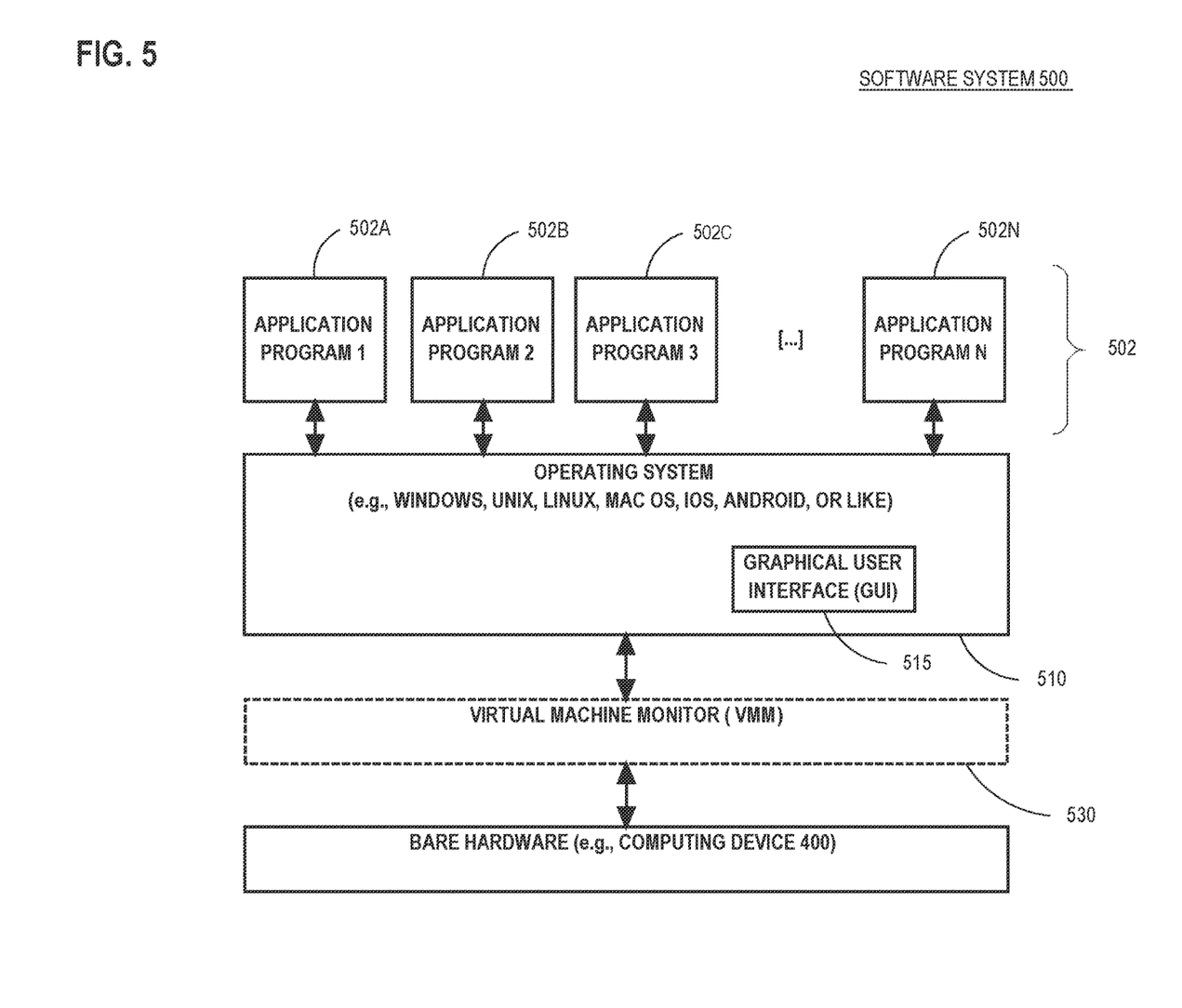
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
assigning a plurality of threads to a hardware pipeline that contains a sequence of hardware stages that include: a computing stage, a suspending stage, and a resuming stage, wherein:
each cycle of the hardware pipeline can concurrently execute a respective distinct stage of the sequence of hardware stages for a respective distinct thread of the plurality of threads, and
a read of a random access memory (RAM) can be requested for a thread of the plurality of threads only during the suspending stage;
while a previous state of a plurality of states of a finite state machine that implements a coroutine of the thread of the plurality of threads is in the suspending stage of the sequence of hardware stages:
requesting a read of the RAM, and
unconditionally suspending the thread;
while the coroutine of the thread is in the resuming stage of the sequence of hardware stages, correlating an asynchronous response from the RAM to: the thread and a next state of the plurality of states of the finite state machine; and
while in the computing stage of the sequence of hardware stages, the next state of the plurality of states of the finite state machine executing based on the asynchronous response from the RAM.

2. The method of claim 1 wherein:
the thread is a first thread;
the requesting the read is a first requesting a first read;
the plurality of threads contains a second thread;
the method further comprises:
after the first thread first requesting, the second thread second requesting a second read;
after the second thread second requesting and before the first thread is in the resuming stage, the second thread entering the resuming stage.

3. The method of claim 2 wherein:
the plurality of states of the finite state machine that implements the coroutine is a first plurality of states of a first finite state machine that implements a first coroutine;
the second thread has a distinct second plurality of states of a distinct second finite state machine that implements a second coroutine.

4. The method of claim 3 wherein:
the first coroutine and the second coroutine are specialized to perform different operations on the same abstract data type;
the abstract data type is selected from the group consisting of: hash table, B+ tree, and skip list.

5. The method of claim 2 wherein:
the first thread and the second thread have different respective instances of said finite state machine;
the respective instances of the finite state machine of the first thread and the second thread do not share a current state of the plurality of states of the finite state machine.

6. The method of claim 1 wherein:
the hardware pipeline does not execute instructions of an instruction set architecture (ISA);
the hardware pipeline comprises a field programmable gate array (FPGA) or an application specific integrated circuit (ASIC).

7. The method of claim 1 wherein in each cycle, the hardware pipeline can perform exactly one selected from the group consisting of: resume a suspended thread and start a thread that is in a first state of a finite state machine.

8. The method of claim 7 further comprising starting the thread that is in the first state only if the hardware pipeline has no thread to resume in the current cycle.

9. The method of claim 1 wherein said correlating the asynchronous response from the RAM to the thread and the next state of the plurality of states of the finite state machine is based on a volatile lookup table that contains a respective entry for each thread in the plurality of threads.

10. The method of claim 1 wherein:
the assigning the plurality of threads to the hardware pipeline is performed by a load balancer that is connected to a plurality of hardware pipelines that includes the hardware pipeline;
the load balancer and the plurality of hardware pipelines are contained in a same integrated circuit chip.

11. The method of claim 10 wherein the plurality of hardware pipelines contains different hardware pipelines that are respectively specialized for respective abstract data types.

12. The method of claim 1 wherein latency of the RAM exceeds three cycles of the hardware pipeline.

13. The method of claim 1 wherein:
the thread is a first thread;
the requesting the read is a first requesting a first read in a first cycle in a sequence of cycles that includes a second cycle that is adjacent to the first cycle;
the plurality of threads contains a second thread;
the method further comprises the second thread second requesting a second read in the second cycle.

14. One or more non-transitory computer-readable media storing instructions that, when executed by one or more processors, cause:
assigning a plurality of threads to a hardware pipeline that contains a sequence of hardware stages that include: a computing stage, a suspending stage, and a resuming stage, wherein:
each cycle of the hardware pipeline can concurrently execute a respective distinct stage of the sequence of hardware stages for a respective distinct thread of the plurality of threads, and a read of a random access memory (RAM) can be requested for a thread of the plurality of threads only during the suspending stage;

while a previous state of a plurality of states of a finite state machine that implements a coroutine of the thread of the plurality of threads is in the suspending stage of the sequence of hardware stages:
  requesting a read of the RAM, and
  unconditionally suspending the thread;

while the coroutine of the thread is in the resuming stage of the sequence of hardware stages, correlating an asynchronous response from the RAM to: the thread and a next state of the plurality of states of the finite state machine; and while in the computing stage of the sequence of hardware stages, the next state of the plurality of states of the finite state machine executing based on the asynchronous response from the RAM.

15. The one or more non-transitory computer-readable media of claim 14 wherein:
  the thread is a first thread;
  the requesting the read is a first requesting a first read;
  the plurality of threads contains a second thread;
  the instructions further cause:
    after the first thread first requesting, the second thread second requesting a second read;
    after the second thread second requesting and before the first thread is in the resuming stage, the second thread entering the resuming stage.

16. The one or more non-transitory computer-readable media of claim 14 wherein:
  the hardware pipeline does not execute instructions of an instruction set architecture (ISA);
  the hardware pipeline comprises a field programmable gate array (FPGA) or an application specific integrated circuit (ASIC).

17. The one or more non-transitory computer-readable media of claim 14 wherein in each cycle, the hardware pipeline can perform exactly one selected from the group consisting of:
  resume a suspended thread and start a thread that is in a first state of a finite state machine.

18. The one or more non-transitory computer-readable media of claim 14 wherein said correlating the asynchronous response from the RAM to the thread and the next state of the plurality of states of the finite state machine is based on a volatile lookup table that contains a respective entry for each thread in the plurality of threads.

19. The one or more non-transitory computer-readable media of claim 14 wherein:
  the assigning the plurality of threads to the hardware pipeline is performed by a load balancer that is connected to a plurality of hardware pipelines that includes the hardware pipeline;
  the load balancer and the plurality of hardware pipelines are contained in a same integrated circuit chip.

20. The one or more non-transitory computer-readable media of claim 14 wherein:
  the thread is a first thread;
  the requesting the read is a first requesting a first read in a first cycle in a sequence of cycles that includes a second cycle that is adjacent to the first cycle;
  the plurality of threads contains a second thread;
  the instructions further cause the second thread second requesting a second read in the second cycle.

* * * * *